US007376574B2

(12) United States Patent
Toan et al.

(10) Patent No.: US 7,376,574 B2
(45) Date of Patent: May 20, 2008

(54) SYSTEM AND METHOD FOR OPTIMIZING BENEFIT PLAN DESIGNS

(75) Inventors: Barrett Toan, St. Louis, MO (US); Robert Nease, St. Louis, MO (US)

(73) Assignee: Express Scripts, Inc., St. Louis, MO (US)

( * ) Notice: Subject to any disclaimer, the term of this patent is extended or adjusted under 35 U.S.C. 154(b) by 1119 days.

(21) Appl. No.: 09/760,113

(22) Filed: Jan. 12, 2001

(65) Prior Publication Data

US 2002/0095316 A1 Jul. 18, 2002

(51) Int. Cl.
*G06Q 40/00* (2006.01)
*G06Q 10/00* (2006.01)
*G06F 17/30* (2006.01)

(52) U.S. Cl. .................... 705/4; 705/1; 705/10; 705/35

(58) Field of Classification Search .................... 705/4, 705/35, 1, 10
See application file for complete search history.

(56) References Cited

U.S. PATENT DOCUMENTS

| 5,754,980 | A | | 5/1998 | Anderson et al. |
| 5,809,478 | A | | 9/1998 | Greco et al. |
| 6,012,051 | A | | 1/2000 | Sammon, Jr. et al. |
| 6,014,632 | A | | 1/2000 | Gamble et al. |
| 6,067,522 | A | * | 5/2000 | Warady et al. .................. 705/2 |
| 6,092,047 | A | * | 7/2000 | Hyman et al. ............ 705/36 R |
| 2002/0049617 | A1 | * | 4/2002 | Lencki et al. ................... 705/4 |

OTHER PUBLICATIONS

Anonymous, "Internet Access Rapidly Expanding Among 401(K) Plan Participants, Survey Says." Nov. 16, 1999; PR Newswire; 2 pages.*

* cited by examiner

*Primary Examiner*—C. Luke Gilligan
*Assistant Examiner*—Rachel L. Porter
(74) *Attorney, Agent, or Firm*—Bryan Cave LLP

(57) ABSTRACT

A computer-based system and method to enable a benefit plan sponsor to design benefit plans for a given participant population by enabling the plan designer to select the plan design options that maximize the perceived benefit to the participant population subject to a cost constraint. The system prioritizes plan design options of such plans according to the costs of these options and the perceived benefits of these options for the participant population. Estimates of perceived benefit are based upon survey data from a sample of the given population or from historical survey data from population samples exhibiting analogous demographic characteristics to the given participant population regarding potential plan design options or analogous benefit plan design options.

2 Claims, 7 Drawing Sheets

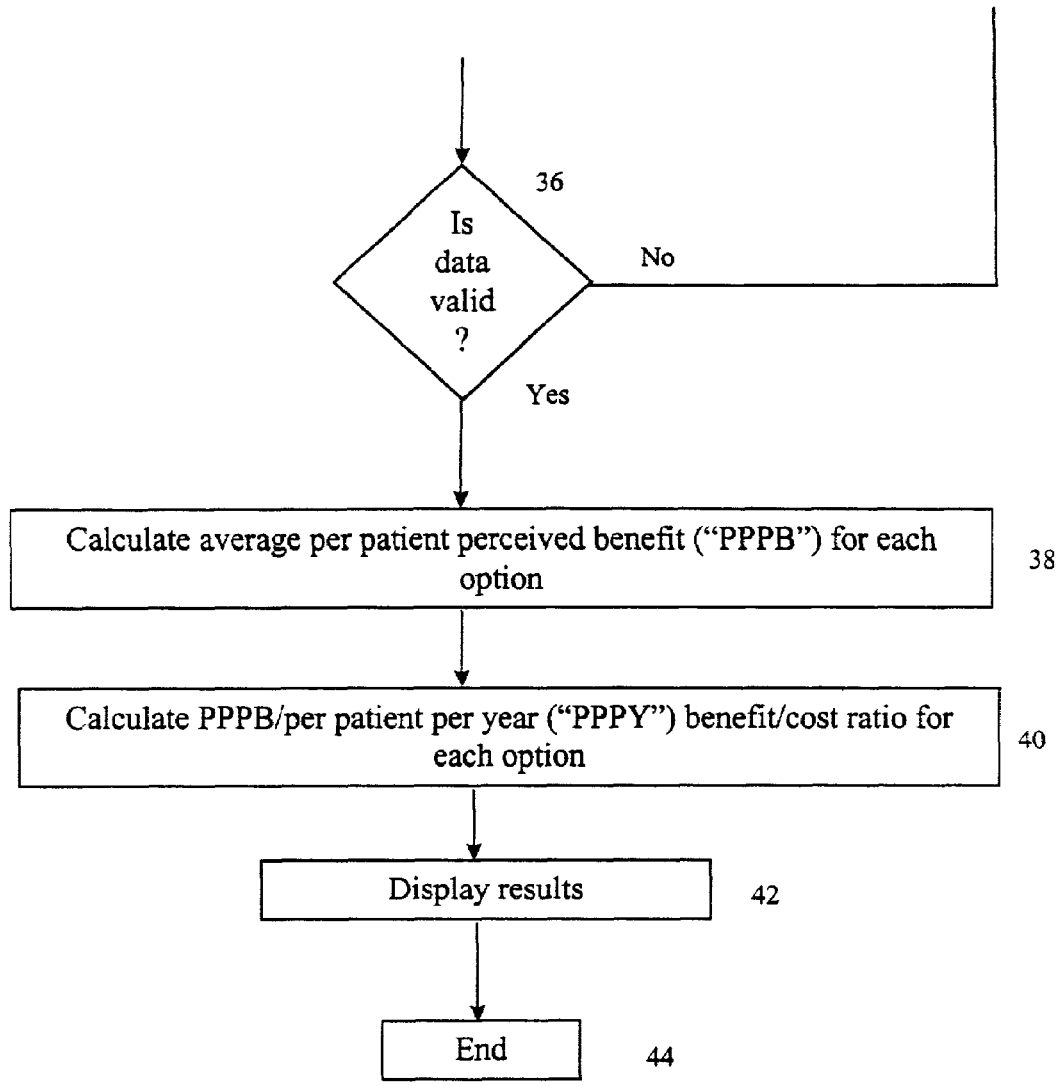

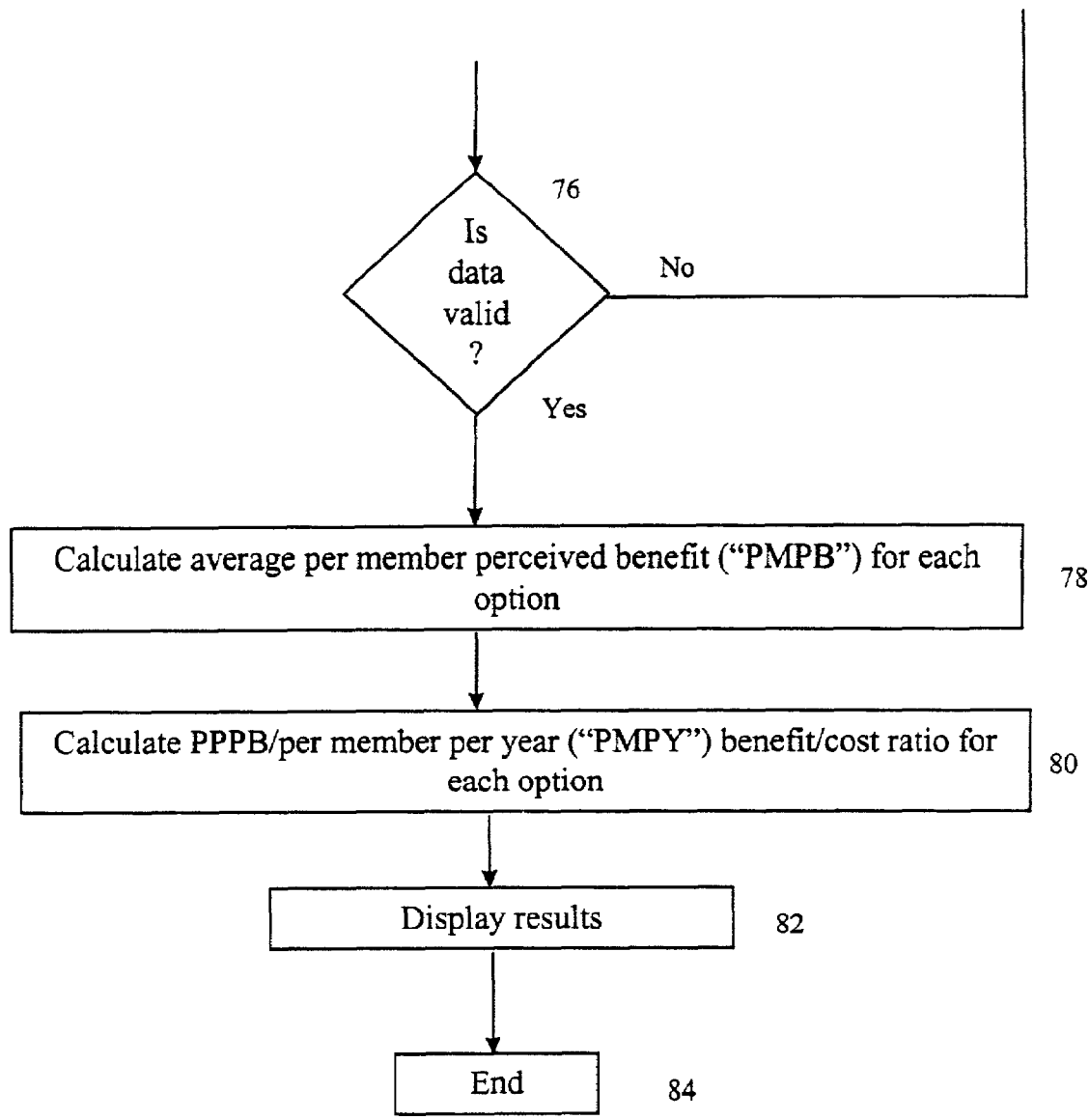

SYSTEM AND METHOD FOR OPTIMIZING BENEFIT PLAN DESIGNS

FIELD OF THE INVENTION

A computer-based system and method for optimizing the design of benefit plans offered to a given participant population by preferably prioritizing plan design options that can be incorporated in such plans according to the relative perceived benefits derived from each option based upon, preferably assessment data from a sample of the participant population quantifying relative perceived benefits attributed to potential plan design options and/or historical assessment data from population samples exhibiting analogous demographic characteristics to the given participant population regarding potential plan design options or analogous benefit plan design options.

BACKGROUND OF THE INVENTION

Benefit plans that provide partial or complete reimbursement of expenditures incurred by participants in the plan are commonly offered by employers, associations, commercial entities and the like, that sponsor such plans as fringe benefits for employees or members or as a commercial service available to the general public. Potential sponsors of benefit plans are often constrained by resource limitations when making decisions about plan design options in the plans they offer to their participants. Lack of understanding of the relative perceived benefits attributed by the participants to the particular plan design options frustrates the efforts of sponsors to provide participants the most desirable plan design options within given cost constraints.

SUMMARY OF THE INVENTION

The present invention provides a new and unique process for, among other things, preferably developing or modifying benefit plans by enabling identification and incorporation of specific plan design options that maximize the perceived benefits derived from the plans by the given participant population by prioritizing the options according to the relationship between perceived benefit and the cost of providing the option. Using the perceived benefit data derived from the unique process, the present invention also preferably offers sponsors the ability to provide participants with benefit plans having plan design options most closely tailored to the participants' needs and desires. Through initial plan development or modification of plan design options in an existing plan, a plan incorporating those plan design options offering the maximum perceived benefit to participants at a given cost to the sponsor is achieved.

Broadly, in one aspect, the present invention concerns a computer-based method for evaluating a plurality of plan design options by comparing the cost of providing each option to the benefits of each option perceived by a group of one or more subjects comprising the steps of:

inputting the identification of the plan design options, a reference plan design option and the cost of providing each option;

providing the subject group with information about each plan design option and inquiries to elicit responses comparing each plan design option to the reference plan design option;

inputting data representative of the subject group responses;

calculating the average perceived benefit for each plan design option relative to the perceived benefit for the reference plan design option;

dividing the cost of providing each option by the calculated average perceived benefit for such option; and outputting the calculated data.

Broadly, in another aspect, the present invention concerns a computer-based system for evaluating a plurality of plan design options by comparing the cost of providing each option to the benefits of each option perceived by a group of one or more subjects, comprising:

an input device for receiving input data, a memory device connected to the input device for storing the input data, a processor connected to the memory device which is programmed to perform operations upon stored data to produce output data, and an output device connected to the processor for displaying the output data; and wherein the input device is capable of receiving data representing the identification of the plan design options, the reference plan design option, the cost of providing each option and responses of the subject group to inquiries comparing each plan design option to the reference plan design option; and the processor is programmed for calculating the average perceived benefit for each plan design option relative to the perceived benefit for the reference plan design option and dividing the cost of providing each option by the calculated average perceived benefit for such option.

Broadly, in another aspect, the present invention concerns a computer-based method for evaluating a plurality of plan design options by comparing the benefits of each option perceived by a group of one or more subjects to the cost of providing each option comprising the steps of:

inputting the identification of the plan design options, values of a plurality of statistical factors for each plan design option, and the cost of providing each option, and;

providing the subject group with information about each statistical factor and inquiries to elicit responses providing the relative weight of each statistical factor to be used in determining the perceived benefit of each plan design option;

inputting data representative of the subject group responses;

calculating the average perceived benefit for each plan design option relative to the perceived benefit for the reference plan design option;

dividing the cost of providing each option by the calculated average perceived benefit for such option; and outputting the calculated data.

Other advantages, features, and aspects of the present invention are discussed below.

BRIEF DESCRIPTION OF THE DRAWINGS

A full and enabling disclosure of the present invention, including the presently preferred mode thereof, to one of ordinary skill in the art, is set forth more particularly in the remainder of the specification, including reference to the accompanying drawings, in which.

Figure 1:
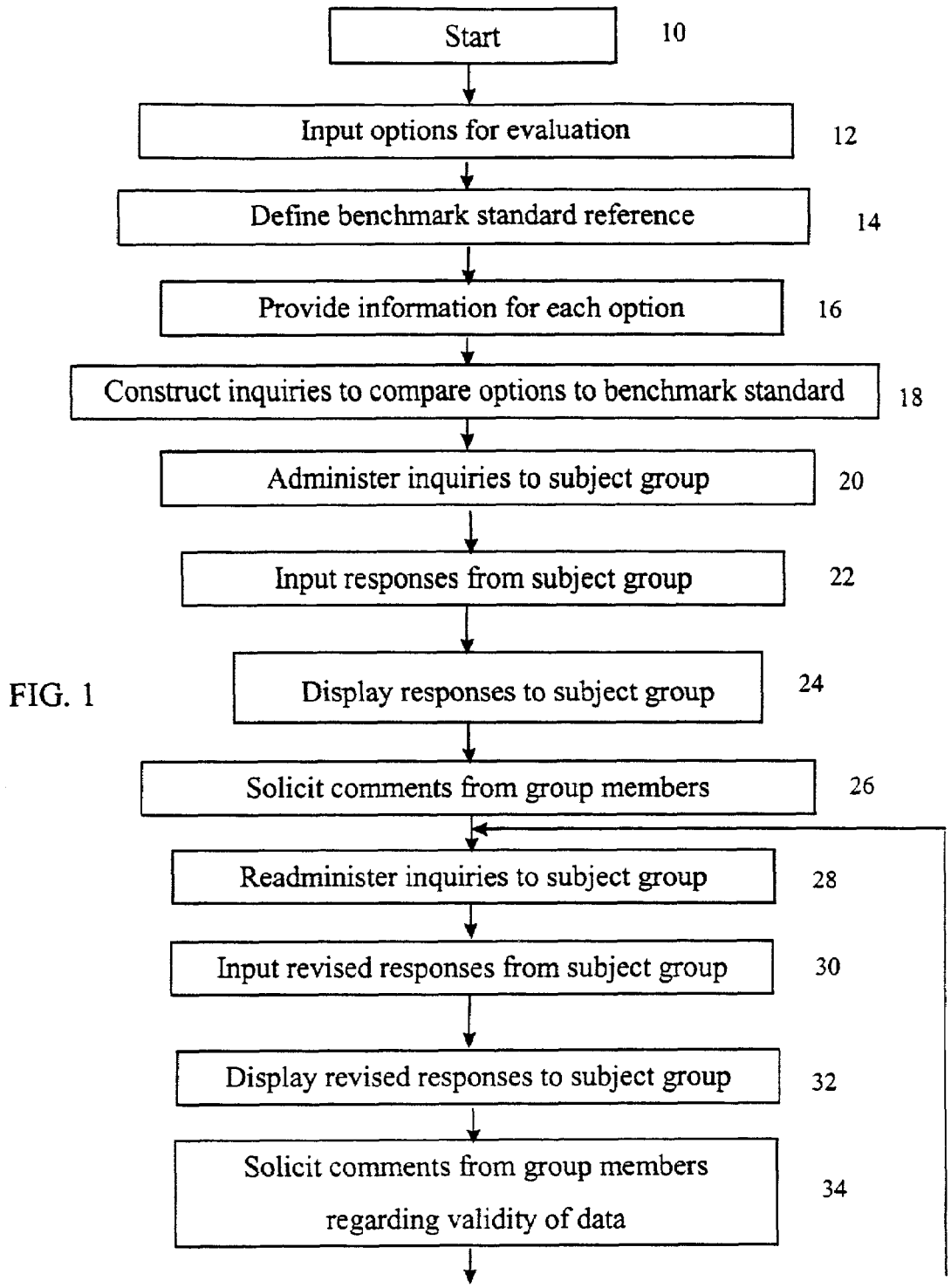
FIG. 1 is a flow chart illustration of the method of the present invention using per-patient cost/benefit ratios.

The drawings are provided for illustrative purposes only and should not be used to unduly limit the scope of the invention.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary constructions.

The method and system of the present invention may preferably be utilized in applications wherein contingent benefits are provided to participants as part of a plan which is underwritten (funded) by a sponsor, such as medical, health, dental, vision, pharmaceutical and other benefit plans. The invention may also preferably be used to design insurance plans covering life, casualty, liability and pet health care expenditures. The invention may preferably be used to optimize the design of plans within cost limitations established by or for the sponsor for an associated participant population, such as a plan an employer may sponsor as a fringe benefit for its employees. Alternatively, by identifying and selecting plan design options that generate perceived benefits to the participants such that participants are willing to pay amounts in excess of the sponsor's costs for participation in the plan, the system can be used to fashion plans that an entrepreneurial sponsor may offer to a predetermined market segment with an expectation of generating a profit.

The method and system of the present invention may also preferably be utilized by an individual to analyze plan design options from which a participant or prospective participant may select to design a benefit plan specifically tailored for the individual participant and/or the participant's dependents, such as family members. In designing such a benefit plan, the individual may be presented with an array of predetermined plan design options from which to select and/or the opportunity to create plan design options.

Although the present invention is described herein within the context of the preferred embodiment relating to the selection of plan design options which represent benefit attributes in pharmaceutical benefit plans, specifically evaluation of disease/treatment coverage options, it will be recognized by those skilled in the art that the system is not limited to disease/treatment coverage plan design options or to pharmaceutical plans. Rather, the present invention is applicable to many types of benefit and insurance plans to optimize the selection of options based upon perceived consumer benefits.

Pharmaceutical Benefit Plans

A pharmaceutical benefit plan sponsor typically develops a plan by selecting from among groups of predetermined plan design options, or by selecting one or more plan design options and, if appropriate, establishing the values of parameters associated with the selected plan design options. For example, a pharmaceutical benefit plan may comprise plan design options and associated benefit coverage parameters that preferably include: monthly fixed contribution payment amount, periodic deductible amount, transactional copayment amount, coinsurance payment percentage, stop loss limitation, benefit cap limitation, pharmaceutical formulary coverage, pharmaceutical rebate applicability, retail network availability, mail delivery option, and generic pharmaceutical coverage. As known in the field of benefit plan development, these terms are defined below:

monthly fixed contribution payment—a monthly fee paid by the participant periodic deductible—an expenditure level below which the cost of the covered pharmaceuticals is borne by the participant (in some plans, until the deductible amount is met, the participant is extended the benefit of purchasing covered pharmaceuticals at the same price as paid by the sponsor)

transactional copayment—the amount paid by the participant in the purchase of a given pharmaceutical coinsurance payment percentage—the proportional amount of the cost of a given pharmaceutical paid by the participant stop-loss—a limitation on the out-of-pocket expenses for the participant, above which level the plan sponsor bears all costs benefit cap—a limitation a benefit maximum, limiting the amount the plan will provide to a participant or the participant and covered dependents, such that the participant bears all costs above the plan's cap pharmaceutical formulary coverage—plan benefits that apply to specific predetermined pharmaceuticals for the treatment of a given condition pharmaceutical rebate applicability—rebates that apply to purchases of specific pharmaceuticals retail network availability—plan benefits that apply to purchases made at retail pharmacies mail delivery option—plan benefits that apply to purchases of pharmaceuticals delivered by mail from predetermined suppliers generic pharmaceutical coverage—plan benefits that apply to purchases of generic pharmaceuticals Additionally, the sponsor may select disease/treatment coverage options, such as whether and to what extent identified treatments for specific disorders and/or types of disorders are to be covered by the plan. Disease/treatment coverage options may be classified according to inclusive groups of disease states, such as, for example: allergy; asthma; depression; gastrointestinal; and lipid disorders (e.g., hypercholesterolemia). Treatment coverage may also be categorized by the nature of the condition for which relief is provided, such as, for example, treatments that provide lifestyle maintenance, such as remedies for hair loss, as opposed to lifesaving treatments, such as insulin for diabetes. Although degree of coverage may be focused on alternative pharmaceuticals (e.g., low or no transactional copayment for a generic cholesterol-lowering medication, and a higher copayment for more expensive cholesterol-lowering medications), degree of coverage may also be varied based on the nature of the condition (e.g., lower transactional copayments for lifesaving treatments, and higher copayments for lifestyle enhancing treatments). Indeed, decisions about the degree of coverage can be based on the perceived health benefit associated with such treatments, or on the ratio of cost to perceived health benefit associated with such treatments. A preferred method for carrying out the subject invention can be described in the context of evaluating benefit plan options with respect to treatments for different types of medical disorders.

Selecting Disease/Treatment Groups for Evaluation

When used for the selection of disease/treatment coverage plan design options, the operation of the preferred embodiment of the invention commences with the input of disease/treatment group options that the sponsor deems as potentially desirable components of a plan to be offered to participants. One potential method of analyzing potential treatments is by classifying them into inclusive groups of disease states, such as, for example: allergy; asthma; depression; gastrointestinal; and lipid disorders (e.g., hypercholesterolemia).

Description of each Disease/Treatment Group Option

Next, descriptions of each disease/treatment group option and related information are prepared for presentation to a group of subjects, preferably selected from the participant population. The following information for each of disease/treatment group option under consideration may be provided to the subjects:
Description of the disease. This description should include information about
the spectrum of disease and its effect on length of life, quality of life, and productivity.
Description of the disease/treatment group. This description should include the medications used for the disease/treatment group.
Description of the benefits resulting from the treatment, for example, prevention of one stroke per 100,000 people treated per year, relative to the consequences of no treatment or non-prescription approaches, such as lifestyle changes, for example, diet and exercise. This description may also include information about the variation in benefit derived by different patients. For example, use of cholesterol-lowering medications for patients who have experienced a myocardial infarction (heart attack) is likely to be perceived as providing more benefit than the use of those same medications for patients with slightly elevated serum cholesterol, in part because the latter can typically manage their symptoms by changes in diet or lifestyle.
Description of any side effects resulting from the treatment.

Defining a Reference Disease/Treatment Group

Next, a disease/treatment group, preferably one of the proposed disease/treatment group options, is selected as the reference disease/treatment group. Assessments of the perceived benefit of the remaining proposed disease/treatment group options will be made by comparison to the perceived benefit of the reference disease/treatment group. For example, anti-asthmatic medications for the management of asthma might be selected as the reference disease/treatment group. For determination of optimum allocation of medical treatment resources, a standard reference of perceived benefit, such as the benefit derived from treating 1,000 patients with asthma, may be used to quantify and thereby compare the perceived benefit of various disease/treatment group options. By eliciting feedback from a representative sample of the participant population regarding their subjective evaluations of the perceived benefit of coverage for each disease/treatment group option, a relative scaling of the benefit of the various disease/treatment group options may be established. Unless otherwise indicated, all references to cost/benefit analysis with respect to this invention relate to subjectively determined perceived benefit assessments.

Eliciting Subject Group Evaluations

In a preferred embodiment of the present invention, the determination of the relative cost/benefit can be based upon survey data from each individual participant, or from a statistical sample (subject group) of the given participant population. The subject group(s) may comprise potential benefit plan participants, such as employees or patients, as well as benefit plan managers and health care providers. If more than one group is surveyed, results are preferably generated for each group, along with a summary encompassing the results of all groups. Once the subject group has reviewed the information regarding the disease/treatment group options, the survey assessment is commenced.

The assessment questions and descriptions for each of the disease/treatment group options of a preferred embodiment of the present invention may be conveyed to the subject group through a variety of media including, for example, overhead projector, lecturer, computer monitor, graphical user interface ("GUI"), Internet, e-mail, CDROM, cellular telephone display, PDA display, printout, facsimile, mail or other method of image, data or document transmission. Similarly, in a preferred embodiment of the present invention, the inputting of plan options and the responses of the subject group may be accomplished by the subject, an interviewer or other operator through a variety of input devices including, for example, keyboard, keypad, Internet access device, e-mail, voice recognition program, telephone, cellular telephone, pager, PDA, GUI, or other voice or data input device, including, for example, keying in or scanning information from a source document marked or punched by the subject.

The quality of the assessments may be enhanced by appropriately preparing the subjects. One approach is to inform the subjects of the need to make decisions concerning the benefit plan coverage, specifically that not all medications needed to treat all diseases can be fully covered. Subjects may be informed that if all medications were fully covered, due to cost constraints, other benefits, such as vacation time, may need to be reduced or eliminated. Subjects may also be requested to imagine that they are members of an advisory board convened by their employer to provide advice about which medications should be covered, and to what extent. This exercise aids the subjects in understanding how their assessments can be used by sponsors to make benefit plan decisions.

An example question to elicit subjective evaluations of the perceived benefit of a disease/treatment group option, such as treating arthritis patients with non-steroidal anti-inflammatory drugs ("NSAIDS"), may be stated in the following form: "treating 1,000 asthma patients with anti-asthmatics provides the same benefit as treating how many rheumatoid arthritis patients with NSAIDS?" By similarly questioning subjects regarding other types of proposed treatments in comparison with the same reference disease/treatment group option (e.g., anti-asthmatics for asthma patients), numerical data can be collected on each subject's relative per-patient perceived benefit of each disease/treatment group option.

For example, if a subject indicates that treating 1,000 patients with anti-asthmatics is equivalent to treating 2,000 arthritis patients with NSAIDS, then that subject's per-patient perceived benefit for NSAIDS among arthritis patients is 1,000/2,000=0.5. In other words, treating two patients with NSAIDS generates the same perceived benefit as treating one patient with anti-asthmatics. High perceived benefit treatments are generally those that are life sustaining, such as insulin for diabetes, whereas low benefit treatments are typically those that are considered "lifestyle" drugs, such as remedies for hair loss.

In soliciting assessment of the perceived benefit, certain criteria can be suggested for evaluation. These criteria may include effects of treatment on length of the patient's life, quality of life, and productivity in the workplace or home environment. In addition, the timing of these effects (e.g., immediate results versus 15 years in the future) and the availability of non-prescription alternatives (e.g., changes in lifestyle) may also be considered. Further, the spectrum of disease and variation in the appropriateness of use of the treatment may also be considered. For example, use of cholesterol-lowering medications among patients with a history of myocardial infarction ("heart attack") has been demonstrated to improve longevity. However, use of those same medications among patients with mildly elevated serum cholesterol and no evidence of coronary artery disease offers substantially less benefit; in addition, such patients may be able to effectively manage their cholesterol through changes in diet and exercise. All of these issues may be relevant for subjects considering the overall perceived benefit.

Perceived benefit may optionally be derived from a cumulation of the subject's responses to separate inquiries into an explicit set of component benefit criteria, such as length of life, quality of life, and productivity. In this approach, the relative benefit for plan design option is determined for each specific criterion, and a combining rule that defines the relative weight attributed to each criterion is applied to determine the overall perceived benefit for each plan design option. This approach allows the subjects to focus on one benefit criterion at a time, by providing responses assessing the perceived benefit of each plan design option for each criterion. These assessments may be made relative to the reference plan design option or based on an absolute scale associated with the benefit criteria, such as a rating scale from zero to one hundred representing a range of the plan design option providing no benefit with respect to that criterion to providing the maximum benefit possible for the criterion.

Once the benefit of the plan design option has been assessed for each benefit criteria, a combining rule may be applied across the assessments for the benefit criteria to obtain an overall perceived benefit for the plan design option. The combining rule preferably results in the overall perceived benefit for a given plan design option being monotonically increasing with the recognition of an assessed perceived benefit in each of the benefit criteria.

For example, length of life, quality of life, and productivity may be chosen as the benefit criteria for a component-based assessment. An example question to elicit subjective evaluations of the perceived benefit of treating arthritis patients with NSAIDS with respect to the quality of life criterion may be stated in the following form: "In terms of quality of life alone, treating 1,000 asthma patients with anti-asthmatics provides the same quality of life benefit as treating how many rheumatoid arthritis patients with NSAIDS?" If a subject indicates that in terms of the quality of life benefit provided, treating 1,000 patients with anti-asthmatics is equivalent to treating 2,000 arthritis patients with NSAIDS, then that subject's relative perceived quality of life benefit for NSAIDS among arthritis patients is 1,000/2,000 =0.5. Similarly, questions can be utilized to assess the relative benefit for the plan design option for each of the benefit criteria. For example, if NSAIDS provide no length of life benefit, the relative perceived length of life benefit is 0, whereas if NSAIDS provide a productivity benefit equivalent to that offered by anti-asthmatics (i.e., in terms of productivity alone, treating 1,000 patients with anti-asthmatics is equivalent to treating 1,000 patients with NSAIDS), the relative productivity benefit is 1.0.

Once the relative benefit for each of the benefit criteria for a given plan design option (e.g., 0 for length of life, 0.5 for quality of life, and 1.0 for productivity) has been assessed, a combining rule can be applied to determine the overall perceived benefit for the plan design option. Such a rule defines the relative weight accorded to each specific benefit criterion. These relative weights can be determined by querying the subject group.

One approach for determining the relative weights for the combining rule is to focus on the reference plan design option. An example question to elicit the subjective weight for productivity relative to quality of life may be stated in the following form: "The quality of life benefit from treating 1,000 asthma patients with anti-asthmatics is equal to the productivity benefit from treating how many arthritis patients with anti-asthmatics?" If, for example, the quality of life benefit from treating 1,000 asthma patients is equal to the productivity benefit from treating 2,000 asthma patients, then the relative weight for productivity is 0.5 (=1,000/2,000). Similarly, if, for example, the quality of life benefit from treating 1,000 asthma patients is equal to the length of life benefit from treating 5,000 asthma patients, then relative weight for length of life is 0.2 (=1,000/5,000). By definition, the relative weight for quality of life would be 1.0.

One possible combining rule is to multiply the relative weight for each benefit criteria times the subject's assessment of that benefit criteria for a given plan design option, and to sum these products for each benefit criterion to determine the perceived benefit for the given plan design option. The resulting value is then divided by a similar value calculated for the reference plan design option. For example, if the relative weights for length of life, quality of life, and productivity are defined as 0.2, 1.0, and 0.5 respectively, the perceived benefits from NSAIDS for length of life, quality of life, and productivity are assessed as 0, 0.5, and 1.0 respectively, and the perceived benefits from anti-asthmatics are 1.0, 1.0, and 1.0 respectively (by definition), then the overall perceived benefit from NSAIDS would be [(0.2×0)+(1.0×0.5)+(0.5×1.0)]/[(0.2×1.0)+(1.0×1.0)+(0.5×1.0)] =0.59.

Additionally, the perceived benefit for some benefit criteria may be related directly to measurable statistical factors. In such situations, these statistical measures may be used directly as the measure of relative benefit for those benefit criteria. For example, in assessing the benefit criterion of relative productivity, if the use of NSAIDS among patients with rheumatoid arthritis reduces lost time from work by 5 days per year, and the use of anti-asthmatics reduces lost time from work by 6 days per year, then the relative productivity benefit from NSAIDS is 0.83 (5 days/6 days). Because these statistical factors may be observable and measurable, this approach allows increased objectivity in the assessment of overall perceived benefit for those benefit criteria while reducing the number of assessments required from the subject group.

Providing Feedback to the Subject Group

Although a wide range in the tabulated perceived benefit values may be expected based upon the composition of the subject group, the range of variation of the perceived benefit values may be substantially narrowed by providing feedback of the entire subject group's cumulative responses to each subject and then allowing the subject group to reevaluate the benefit associated with the disease/treatment group option under consideration. A graphical depiction of the distribution of the subjects' per-patient perceived benefit for each disease/treatment group option may inform each subject as to whether his or her perception is in general conformity with the remainder of the group. Additionally, subjects may be provided with a graphical depiction of the results of other subject group assessments, such as groups comprising benefit managers, physicians, pharmacists, and employees.

Facilitating Subject Group Discussion

Additionally, by facilitating communications between the members of the subject group regarding the thought processes underlying their assessments of the disease/treatment group options, the subjects can receive beneficial insights into the subject group's overall perceptions of the relative benefits derived from the each disease/treatment group option, further promoting consensus upon reevaluation. In the preferred embodiment of the present invention, discussion among the subjects may be facilitated with focused questions relating to specific segments of the displayed assessment distribution, such as "what issues of this treatment might support a perceived benefit at the upper end of the distribution?" Similarly, a question such as "what rationale is there for responses in the middle of the distribution?," elicits responses from subjects supporting the median perceived benefit assessments. The responses to such inquiries may be instructive to subjects whose responses fall in the extreme ranges of the perceived benefit distribution and may contribute to a more cohesive grouping of responses in subsequent assessments.

Subject Group Reevaluation

Upon completion of the feedback/discussion session, subjects may again be requested to provide responses to the same questions initially posed on the disease/treatment group options being considered. The revised results may be displayed to the subject group, and a more narrow distribution of the above-described values will often be observed. At this time, discussion is preferably focused on any exceptional or deviant data by asking subjects whether there were any misunderstandings regarding the process or the results. If no irregularities are noted, the data can then be used to determine average perceived benefit for the disease/treatment group options being assessed.

Calculation of Cost/Benefit Ratios

Upon completion of the benefit assessment and the input of data reflecting survey responses and treatment costs, the relative costs and perceived benefits can be displayed, and cost/benefit ratios of the proposed disease/treatment group options can be calculated. As more fully detailed below, two methods of conducting the cost/benefit analysis comprise comparing per-patient costs to per-patient perceived benefit and comparing population-based costs to the population-based perceived benefit. Although these two approaches generate different cost and benefit data, the resulting cost/benefit ratios are identical.

Per-Patient Perceived Benefit

Per-Patient Perceived Benefit ("PPPB") is a measure of the perceived benefit derived from treating a defined number of patients. For example, if a group's responses indicate that, on average, treating 1,000 patients with anti-asthmatics is determined to be equivalent to treating 2,000 rheumatoid arthritis patients with NSAIDS, then the per-patient perceived benefit for NSAIDS is 0.5. In other words, treating two patients with NSAIDS generates the same benefit as treating one patient with anti-asthmatics. By contrast, if the group's responses also indicate that treating 1,000 patients with anti-asthmatics is determined to be equivalent to treating 500 seizure patients with anti-epileptic drugs, then the per-patient perceived benefit for anti-epileptics among patients with seizure disorders is 2.0. In other words, it is the perception of the subject group that treating two patients with anti-asthmatics generates the same benefit as treating one patient with anti-epileptic drugs.

Figure 4:
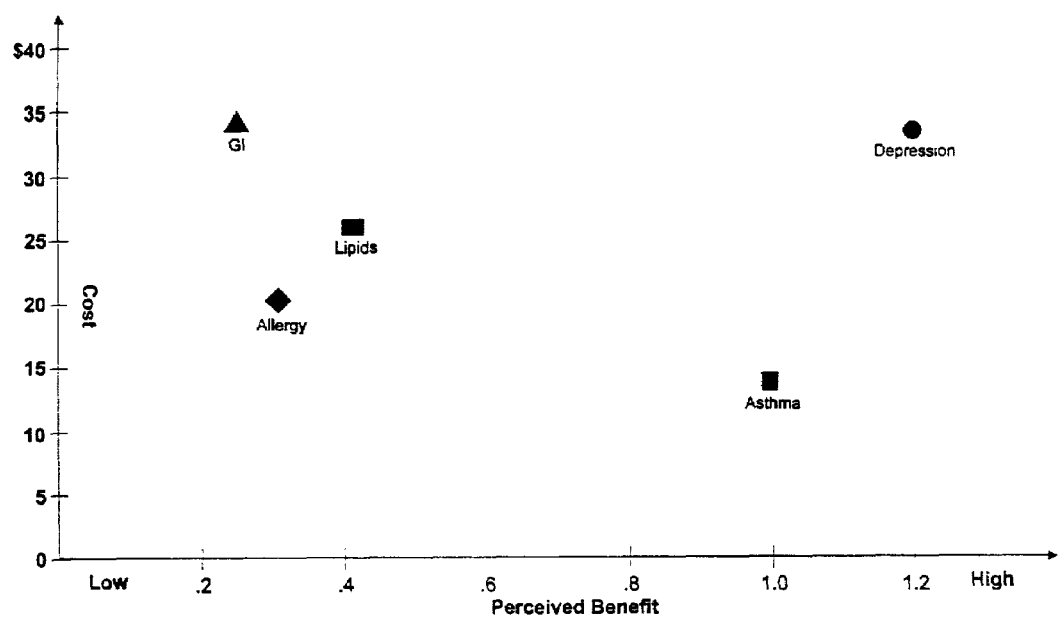
FIG. 4 is an illustration of a graphical depiction of the relative perceived benefit of exemplar plan design options in conjunction with the costs associated with providing each option.
Figure 5:
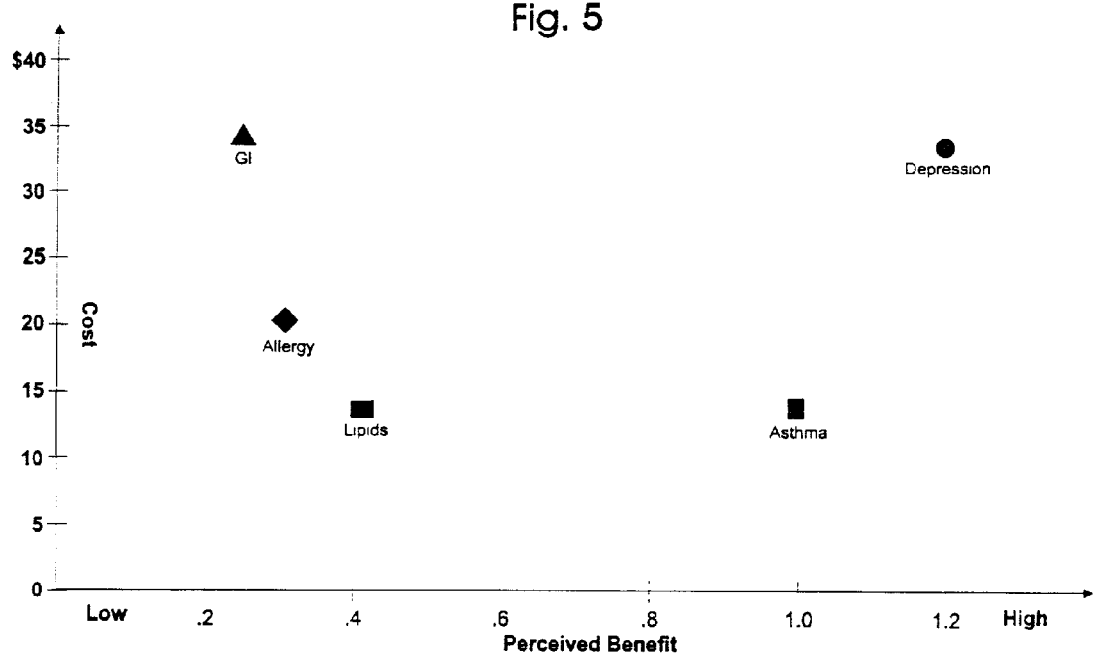
FIG. 5 is an illustration of a graphical depiction of the relative perceived benefit of exemplar plan design options in conjunction with the costs associated with providing each option that demonstrates the effect of a modification in the cost associated with providing one such option.

To compare costs and benefits using this approach, costs must be estimated on a per-patient basis. Per-patient costs for providing coverage of a disease/treatment group option can be calculated by dividing the overall cost for the treatment by the number of patients in the disease/treatment group option. These annual per-patient costs for each disease/treatment group option can then be plotted against the associated per-patient perceived benefit, as shown in FIG. 4. Since the cost of coverage of a disease/treatment group option is necessarily dependent upon the degree of coverage offered by the sponsor, variations in the degree of coverage affect the cost, and hence the vertical (cost) location of the disease/treatment group option plots. For example, if it is assumed that the cost of treating lipid disorders is $26 per year per patient and the sponsor bears 100% of the cost of treatment, i.e., no copayment is required from the participant, the rectangular "Lipid" plot in FIG. 4 depicts this cost information, in connection with the indicated 0.4 perceived benefit relative to the 1.0 for the "Asthma" reference disease/treatment group option. If the plan coverage for treating lipid disorders only is modified such that the sponsor bears only 50% of the cost of this treatment, i.e., a 50% copayment is required from the participant, with the $26 per year per patient cost remaining unchanged, the rectangular "Lipid" plot in FIG. 5 depicts this modified cost to the sponsor of $13 per year per patient, with the unchanged 0.4 perceived benefit relative to the 1.0 for the "Asthma" reference disease/treatment group option.

Population-Based Perceived Benefit

Population-Based Perceived Benefit ("PBPB") is a measure of providing a particular treatment option to an entire population. Per-patient perceived benefit may be converted to perceived benefit for the participant population by incorporating a factor representing the prevalence of treatment for each condition in the population relative to the reference condition (e.g., asthma). Specifically, PBPB can be calculated by multiplying the prevalence of that disease/treatment group option and then dividing by the prevalence of the reference disease/treatment group option. If, for example, the prevalence of the disease/treatment group option under consideration is 10%, and the prevalence of the reference disease/treatment group option is 5%, the population-based perceived benefit for the disease/treatment group option under consideration is twice (i.e., 10% divided by 5%) the per-patient perceived benefit for that disease/treatment group option.

To compare costs and benefits using this approach, costs must be estimated on a population basis. Typically, these costs are estimated on a per-member per-year ("PMPY") basis. PMPY is the annual cost of the medications used in a disease/treatment group option in a population divided by the number of members in that population. PMPY costs can then be plotted against population-based perceived benefit.

Once the relative perceived benefits and costs of treatment options have been determined, the ratio of cost to perceived benefit can be calculated, either on a per-patient or population basis.

Treatment Costs

The cost to the sponsor of providing treatment for each disease/treatment group option may reflect only the direct cost of purchasing the required medication, or alternatively the total cost to the sponsor of providing the treatment, including the sponsor's administrative costs and other indirect expenses associated with the treatment, such as any necessary monitoring that accompanies the treatment. Optionally, the costs may further be defined to include the consequential beneficial effects of the treatment, specifically the avoidance of future expenses resulting from failing to provide the treatment when required, or offsets in other healthcare costs avoided. This cost analysis approach would include, for example, the expected cost savings resulting from reduced hospitalizations for acute exacerbations of asthma attributed to use of anti-asthmatic medications. This approach of including the avoidance of future expenses as a benefit which offsets the sponsor's current costs may provide a more meaningful estimation of the actual costs incurred by the sponsor in providing a comprehensive long-term benefit plan covering a participant's total health care costs. Additionally, although it is not a cost related to medical treatments, in situations where the sponsor is also the participant's employer, the benefit of avoiding lost worker productivity due to early treatment of a medical disorder may also be included in the analysis.

Per-Patient Cost/Benefit Ratios

The per-patient cost/benefit analysis involves comparing per-patient costs to the per-patient perceived benefit. For example, in a population of 10,000 members, 1,000 members may receive medications for asthma, and 4,000 may receive medications for gastrointestinal disorders. If the annual medication cost per patient being treated for asthma is $500, and the perceived benefit per patient treated for asthma is 1.0 (by definition), then the per-patient cost/benefit ratio for asthma is calculated as $500 ($500/1.0). Similarly, if the annual medication cost per member being treated for gastrointestinal disorders is $1,000, and the benefit per patient treated for gastrointestinal (GI) disorders is 0.5 (i.e., the population sample has determined that treating a GI patient provides half the benefit of that associated with treating an asthma patient), then the per-patient cost/benefit ratio for GI is $2,000 ($1,000/0.5).

Population-Based Cost/Benefit Ratios

The population-based analysis involves comparing population-based costs to the population-based perceived benefit. For example, using the above hypothetical facts, the total asthma medication cost is $500,000 ($500/patient×1,000 patients) and the total asthma perceived benefit is 1,000 (1.0×1,000). When spread across the entire population of 10,000 members, the asthma medication cost is $50 per member per year (PMPY=$500,000/10,000 members), and the benefit is 0.10 (1,000/10,000). The population-based cost/benefit ratio for asthma is therefore $500 ($50/0.10).

Similarly, the total GI medication cost is $4,000,000 (=$1,000/patient×4000 patients). The total GI benefit is 2,000 (=0.5×4,000). When spread across the entire member population, the GI medication cost is $400 per member per year (PMPY,=$4,000,000/10,000 members), and the benefit is 0.20 (=2,000/10,000). Therefore, the population-based cost/benefit ratio for GI is $2,000 (=$400/0.20).

Interpretation of Results

In a preferred embodiment of the present invention, once the cost/benefit ratios have been determined, they are preferably presented to the sponsor, participant or other user for review and, if desired, for modification of plan benefit coverage.

By displaying the relationship between perceived benefit and costs graphically, such as depicted in FIG. 4, a comparison of the cost-effectiveness of the disease/treatment group options under consideration is illustrated. As in FIG. 4, when the perceived benefit is depicted along the X axis and the cost is depicted along the Y axis, those treatments with cost/benefit plots extending to the lower right side of the graph are the most cost-effective treatment options, whereas those tending towards the upper left-hand portion of the graph represent those that are relatively less cost-effective.

Figure 6:
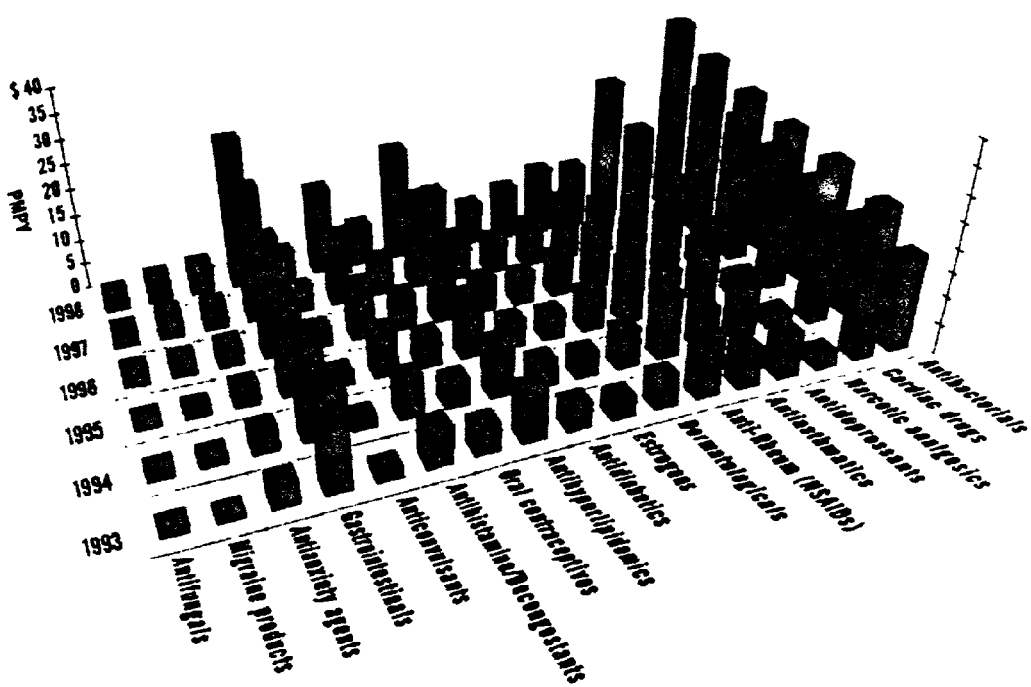
FIG. 6 is an illustration of a three dimensional graphical depiction of the historical perspective of the cost benefit analysis, which shows variations over time along the Z axis.

Additionally, a historical perspective of the cost/benefit analysis may be illustrated by using a three dimensional graphical illustration which shows variations in cost/benefit ratios over time along the Z axis, as illustrated in FIG. 6.

Using the graphical depiction such as illustrated in FIG. 4, any single line emanating from the origin represents combinations of cost and perceived benefit that have identical cost/benefit ratios. Disease/treatment group options with cost/benefit values above the line exhibit higher cost/benefit ratios (i.e., are less cost-effective) than those on the line; disease/treatment group options with cost/benefit values below the line have lower cost/benefit ratios (i.e., are more cost-effective) than those on the line. Ideally, the ratio between cost and benefit for each covered disease/treatment group in a plan should remain constant, with cost/benefit ratios for each disease/treatment group option falling on a single line. By focusing on options with relatively high cost/benefit ratios, a benefit plan administrator can design a benefit plan to bring cost and benefit for disease/treatment group options in closer alignment with the desired balance.

Alternatively, cost/benefit analysis results can be depicted in tabular numeric form, as a ratio of the anticipated cost divided by the perceived benefit. By numerically ranking the proposed treatment options according to the perceived cost/benefit ratio, a plan administrator may prioritize plan options based upon their relative cost-effectiveness (i.e., those with the lowest cost/benefit ratios are the most cost-effective).

The present invention may also be used to depict the cost/benefit ratios for each plan design options in a benefit plan before and after a proposed or implemented modification to highlight the effect of the plan modification.

Additionally, if desired, the selection of plan options incorporated in a proposed plan can be automatically implemented by the computer processor to obtain a projected cost consistent with the sponsor's objectives. Using this approach, plan design options having the lowest cost/benefit ratios are successively selected for incorporation into the plan and the cumulative cost of providing each treatment for the participant population is determined. Progressively higher cost/benefit (less cost effective) options are thus incorporated into the plan design until the sponsor's objective cost is met.

Alternatively, the relative cost/benefit ratios for the plan design options may be inferred from historical benefit assessments of the same or analogous plan design options made by the given participant population or by demographically analogous population samples.

Referring now to FIG. 1, FIG. 1 is a flow chart illustration of the system of one embodiment of the present invention using per-patient cost/benefit ratios. The process commences in Step 12 with the input of disease/treatment group options under consideration for inclusion in the plan. In Step 14, a reference disease/treatment group option for comparison with other disease/treatment group options is defined. In Step 16, information related to each disease/treatment group is provided to each survey subject. In Step 18, inquiries are constructed to elicit responses from the subjects that will provide numerical comparisons of the benefits attributed to each disease/treatment group under consideration with respect to the reference disease/treatment group. In Step 20, the inquiries developed in Step 18 are administered to the subjects through any of several possible media, including individual or group electronic display, printed document, artificial or human voice, overhead projector or personal electronic communication device, such as computer terminal, laptop computer, PDA, pager or cell phone. In Step 22, responses from each subject are input for processing.

Figure 3:
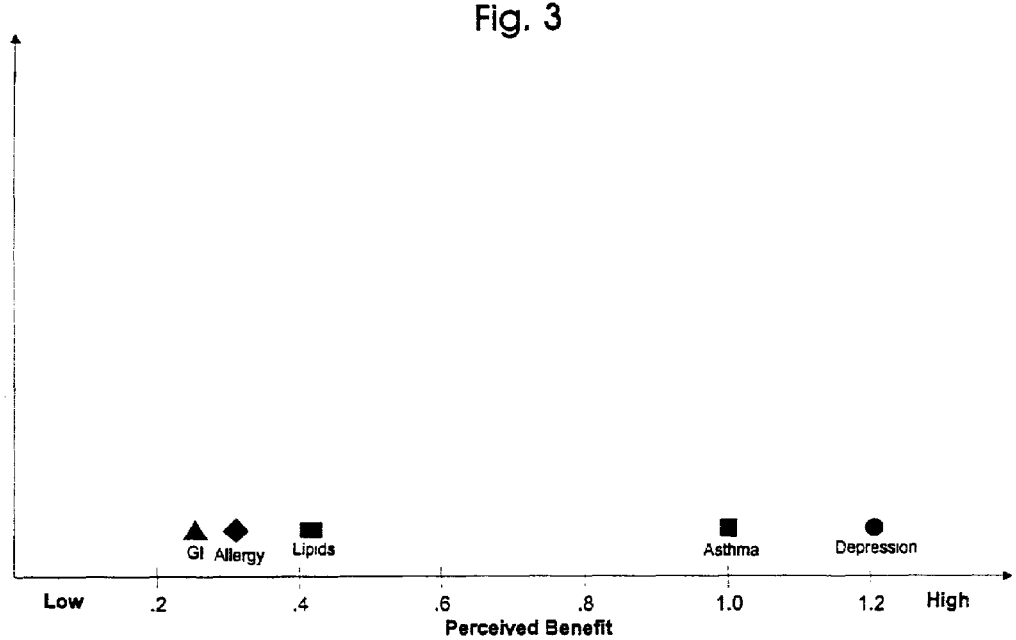
FIG. 3 is an illustration of a graphical depiction of the relative perceived benefits of exemplar plan design options.

In Step 24, the cumulative group responses are displayed to the subjects, preferably by graphical depiction, such as illustrated in FIG. 3. This data may be displayed in a variety of formats, including plotting each individual PPPB response ranging from a low value through a high value along a perceived benefit axis, where each subject indicated a value for X such that treating X patients with the disease of interest was equivalent to treating 1,000 patients with asthma. The information displayed in Step 24 may then be used in Step 26 to prompt discussion among subjects. This group communication may be conducted either in the same physical proximity or through electronic communication means with one another, such as by telephone conference call, Internet communication or other communication means allowing near real time interaction among subjects and a moderator.

With the insight gained from the overall group perception, along with the comments of subjects in evaluating these results, in Step 28 the subjects may elect to revise or confirm their original responses to the survey inquiries. Upon completion of the input of the revised responses in Step 30, in Step 32 the revised responses may be displayed to the subjects in the same manner as in Step 24. In Step 34, comments from the subjects are solicited regarding any potential misunderstandings or miscommunications that may have resulted in the input of erroneous data, or other reasons for altering subject responses. At Step 36, if comments from subjects lead to the conclusion that further assessments are warranted, the process proceeds back to Step 28 for readministration of the inquiries to the subjects. The process thus continues until comments from the subjects indicate that valid data has been obtained in Step 34.

Once the validity of data is assured in Step 36, the data are used to calculate average per patient perceived benefit values for each disease/treatment group in Step 38. In Step 40, the average per-patient per year cost of providing such treatment is divided by the per-patient perceived benefit to determine the per-patient cost/benefit ratio for each disease/treatment group. Finally, in Step 42, the results may be displayed either as tabular results of the computed cost/benefit ratios for each disease/treatment group or alternatively in a graphical format depicting per-patient perceived benefit values along the first axis and the per-patient costs associated with each disease/treatment plotted on the second axis.

Figure 2:
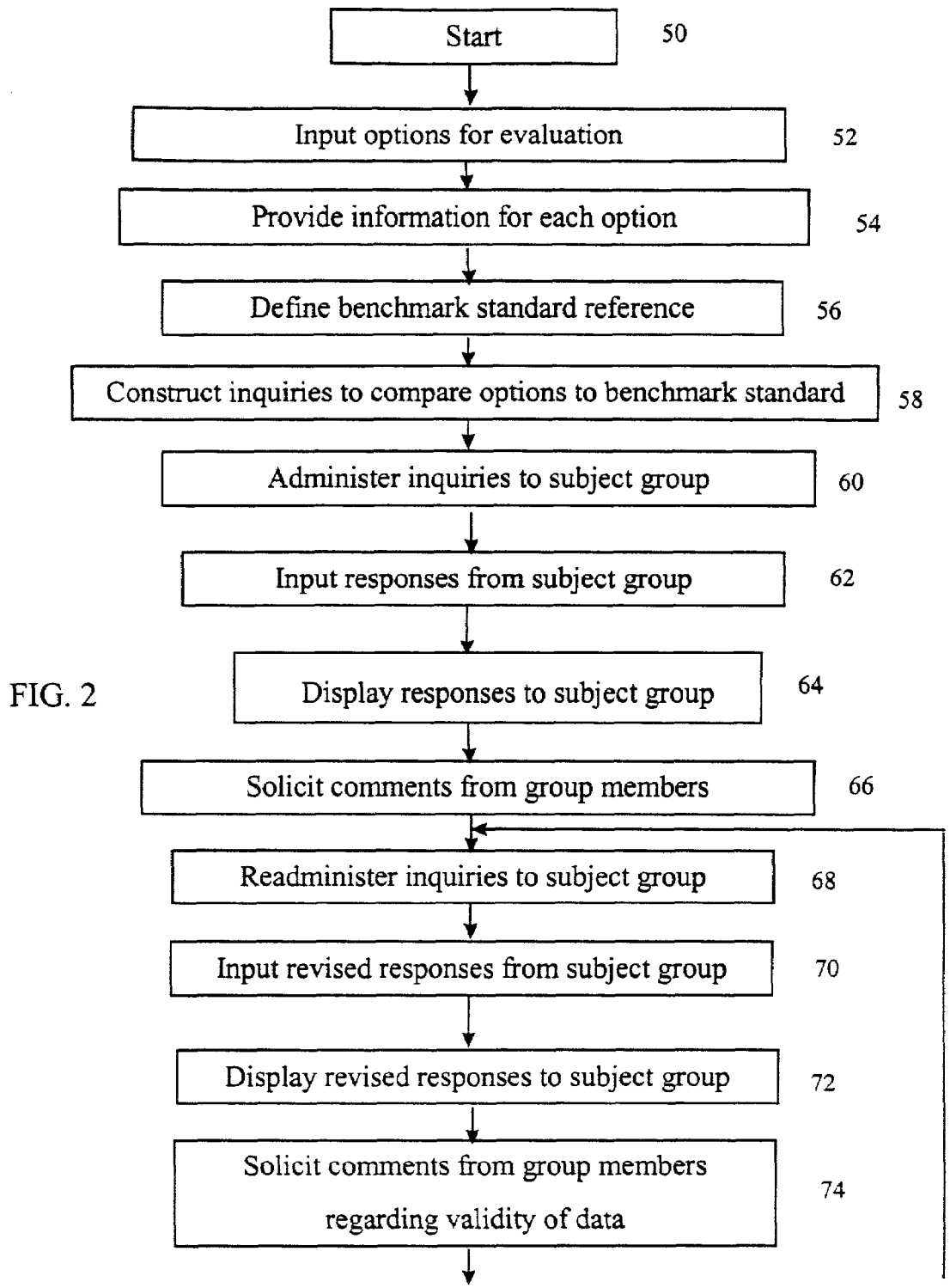
FIG. 2 is a flow chart illustration of the present invention using population-based cost/benefit ratios.

FIG. 2 is a flow chart illustration of the present invention using population-based cost/benefit ratios. Steps 50 through 82 of this process are essentially the same as illustrated in Steps 10 through 42 of FIG. 1, with the exception that in Step 78 the data is used to calculate population-based perceived benefit estimates for each disease/treatment group option, and in Step 80, the average per-member per-year cost of providing such treatment is divided by the population-based perceived benefit to determine the cost/benefit ratio for each disease/treatment group.

Figure 7:
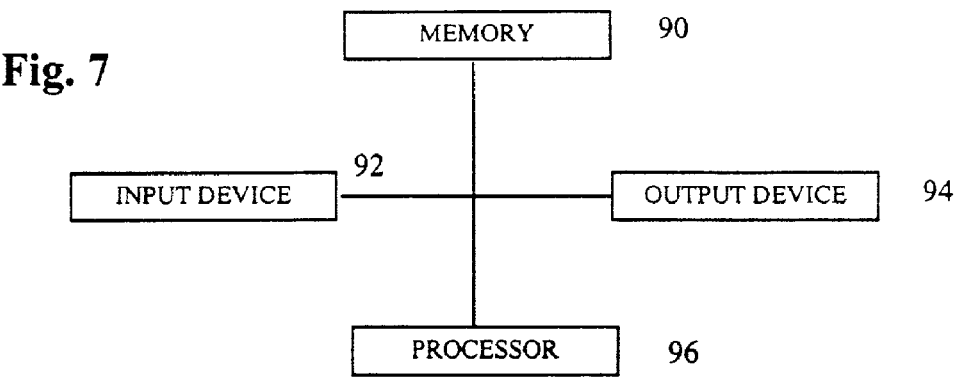
FIG. 7 is an illustration of the system of one embodiment of the present invention.

FIG. 7 is an illustration of the system of one embodiment of the present invention. In FIG. 7, the computer apparatus comprises an input device 90 for receiving input data, a memory device 92 connected to the input device 90 for storing the input data, a processor 94 connected to the memory device 92, that is programmed to perform operations upon stored data to produce output data, and an output device 96 connected to the processor 94 for displaying the output data.

Although preferred embodiments of the invention and preferred methods of practicing the same have been shown and described herein, persons of ordinary skill in the art will recognize and appreciate that the invention encompasses and includes numerous modifications and variations thereto without departing from the spirit and scope of the present invention. In addition, it should be understood, and persons of ordinary skill in the art will recognize, that aspects of the various preferred embodiments discussed herein may be interchanged or eliminated both in whole or in part. Furthermore, those of ordinary skill in the art will appreciate the foregoing description is by way of example only, and does not and is not intended to limit the scope, nature and/or variations of the invention.

What is claimed is:

1. A computer-implemented method for using a computer apparatus for evaluating a plurality of plan design options that can be incorporated into a benefit plan offered to a given participant population by comparing the cost of providing each option to the benefits of each option perceived by a group of one or more subjects, the method comprising the steps of:

inputting the identification of the plan design options, values for each of a plurality of statistical factors related to each plan design option, and the cost of providing each option into the computer apparatus, providing the subject group with information about each statistical factor and inquiries to elicit responses providing the relative weight of each statistical factor to be used in determining the perceived benefit of the plan design options, wherein the subject group is comprised of members of the participant population;

inputting data representative of the subject group responses;

calculating the average perceived benefit for each plan design option, wherein each subject's perceived benefit for each plan design option comprises the sum of the product of the relative weight accorded each statistical factor as defined by the subject's responses multiplied by the value of such statistical factor.

dividing the cost of providing each option by the calculated average perceived benefit for such option; and outputting the calculated data.

2. The method of claim 1 further comprising the step of inputting the identification of a reference plan design option; and wherein the average perceived benefit for each plan design option is determined by comparing values of the statistical factors relating to such plan design option to the values of the statistical factors relating to the reference plan design option.

* * * * *